US011955278B2

(12) United States Patent
Pieper et al.

(10) Patent No.: US 11,955,278 B2
(45) Date of Patent: Apr. 9, 2024

(54) MAGNETIZING DEVICE WITH REDUCED STRAY FIELD

(71) Applicant: TE Connectivity Germany GmbH, Bensheim (DE)

(72) Inventors: Reinhold Pieper, Luedinghausen (DE); Armin Meisenberg, Dortmund (DE); Axel Bartos, Waltrop (DE)

(73) Assignee: TE Connectivity Germany GmbH, Bensheim (DE)

( * ) Notice: Subject to any disclaimer, the term of this patent is extended or adjusted under 35 U.S.C. 154(b) by 723 days.

(21) Appl. No.: 16/742,264

(22) Filed: Jan. 14, 2020

(65) Prior Publication Data

US 2020/0227193 A1 Jul. 16, 2020

(30) Foreign Application Priority Data

Jan. 14, 2019 (DE) ......................... 102019200361.3

(51) Int. Cl.
*H01F 7/02* (2006.01)
*G07D 7/04* (2016.01)
*H01F 13/00* (2006.01)

(52) U.S. Cl.
CPC ............. *H01F 7/0278* (2013.01); *G07D 7/04* (2013.01); *H01F 7/0273* (2013.01); *H01F 13/003* (2013.01)

(58) Field of Classification Search
CPC .... H01F 13/003; H01F 7/0273; H01F 7/0278; G07D 7/04
See application file for complete search history.

(56) References Cited

U.S. PATENT DOCUMENTS 8,910,869 B2 12/2014 Jurgen et al.
9,703,994 B2 7/2017 Paul et al.
2013/0127457 A1 5/2013 Musha et al.
2014/0312894 A1* 10/2014 Bartos .................. G01R 33/091 324/252
2014/0320247 A1* 10/2014 Fullerton .............. H01F 7/0278 335/306
2014/0320248 A1* 10/2014 Fullerton .............. H01F 7/0278 335/306
(Continued)

FOREIGN PATENT DOCUMENTS

CN 105074785 A 11/2015
DE 10 2011 106 263 A1 12/2011
(Continued)

OTHER PUBLICATIONS

Extended European Search Report, European Application No. 20151689.5-1009, European Filing Date, May 11, 2020.
(Continued)

*Primary Examiner* — Mohamad A Musleh
(74) *Attorney, Agent, or Firm* — Barley Snyder

(57) ABSTRACT

A magnetizing device includes a magnet and a magnetic field concentrator. The magnet has a magnetic field forming a magnetization region in which a magnetizable security element is exposed to a magnetic field strength having a defined magnetic field direction. The magnetic field concentrator is formed of a ferromagnetic material. The magnetic field concentrator is arranged in the magnetic field and amplifies and focuses the magnetic field in the magnetization region.

19 Claims, 6 Drawing Sheets

(56) References Cited

U.S. PATENT DOCUMENTS

| | | | |
|---|---|---|---|
| 2016/0055358 A1 | 2/2016 | Paul et al. | |
| 2017/0003358 A1 | 1/2017 | Ueyama | |
| 2017/0350948 A1* | 12/2017 | Bartos | G07D 7/04 |
| 2022/0170729 A1* | 6/2022 | Bartos | G01B 7/003 |

FOREIGN PATENT DOCUMENTS

| | | | | |
|---|---|---|---|---|
| DE | 10 2013 205 891 A1 | | 10/2014 | |
| DE | 10 2013 021 969 A1 | | 6/2015 | |
| DE | 102015002219 A1 | | 8/2016 | |
| EP | 1569177 A1 | * | 8/2005 | |
| EP | 1770657 A2 | | 4/2007 | |
| EP | 3943929 A1 | * | 1/2022 | |
| WO | WO-2010139083 A2 | * | 12/2010 | |
| WO | WO-2011078381 A1 | * | 6/2011 | |
| WO | WO-2013020702 A1 | * | 2/2013 | |
| WO | WO-2013023781 A2 | * | 2/2013 | |
| WO | WO-2014161668 A1 | * | 10/2014 | |
| WO | WO-2015090545 A1 | * | 6/2015 | G07D 7/04 |

OTHER PUBLICATIONS

Abstract of WO 2015090545 A1, corresponding to DE 10 2013 021 969, dated Jun. 25, 2015, 1 page.

Chinese First Office Action dated Oct. 22, 2023 with English translation, corresponding to Application No. 202010035654.3, 21 pages.

* cited by examiner

MAGNETIZING DEVICE WITH REDUCED STRAY FIELD

CROSS-REFERENCE TO RELATED APPLICATION

This application claims the benefit of the filing date under 35 U.S.C. § 119(a)-(d) of German Patent Application No. 102019200361.3, filed on Jan. 14, 2019.

FIELD OF THE INVENTION

The present invention relates to a magnetizing device and, more particularly, to a magnetizing device with a reduced stray field.

BACKGROUND

European Patent Application No. 1770657A1 discloses a device for testing magnetizable security elements in value documents. The security elements are magnetic materials having different coercive field strengths. Before the actual test, the security element is first exposed to a first magnetic field, which is stronger than the coercive field strengths of the magnetic materials contained in the security element. As a result, the magnetic materials are magnetized in a first direction of magnetization. Then the security element is exposed to a second, weaker magnetic field with reverse orientation. This magnetic field magnetizes the low-coercive magnetic material of the security element. However, it is too weak to magnetize the high-coercive magnetic material. Consequently, the regions of the low-coercive magnetic material in the security element and the high-coercive magnetic material regions are magnetized in different directions. When testing the security element, it is possible to differentiate between the different coercive regions.

According to EP 1770657A1, the magnetization regions for magnetizing the magnetic materials in the security element are produced with only one magnet. Although this method is inexpensive, it has the consequence that the generated magnetic field is inhomogeneous. In addition, an antiparallel magnetization of the magnetic materials is not possible. This makes it difficult to distinguish the magnetic materials.

A solution to this problem is described in German Patent Application No. 102011106263 A1. Therein, two magnets are used to generate the first and the second magnetic fields. This allows the antiparallel magnetization of the different coercive magnetic materials. In addition, DE 102011106263 A1 deals with security elements which contain a combined magnetic region, in which the high-coercive and low-coercive magnetic materials overlap. In such combined magnetic regions, the magnetic signals can cancel each other out so that these magnetic regions are not detected. This problem is solved in DE 102011106263 A1 in that the security element is also magnetized in a third direction of magnetization. However, the use of multiple magnets and/or an additional magnetization is associated with increased expense and cost.

German Patent Application No. 102013021969 A1 describes a possibility of producing two magnetization regions with different magnetic field directions for magnetizing a magnetizable security element with only two magnets. For this purpose, the two magnets along a transport direction of the security element are arranged such that they face each other with their north and south poles. As a result, the magnets jointly generate two magnetization regions with different magnetic region directions, wherein the magnetic region strength of the magnetization region which comes first in the transport direction is greater than that of the second magnetization region.

DE 102013205891 A1 also describes a method and a device which make it possible to detect combined magnetic regions with less effort. Security elements for value documents with a plurality of magnetic regions can include at least one high-coercive magnetic region with high-coercive magnetic material, at least one low-coercive magnetic region with low-coercive magnetic material, and possibly a combined magnetic region. In a first magnetization region, all three magnetic regions are magnetized in one direction. In a second magnetization region, the low-coercive magnetic material is re-magnetized in another direction. The magnetic signals of the magnetic regions are detected while the security element is exposed to the second magnetic region. As a result, all three magnetic regions can be distinguished.

Another magnetizing device 200 according to the prior art, as shown in FIG. 1, includes a first magnet 201 and a second magnet 202. The magnets 201, 202 form a common magnetic field, which is shown in the form of field lines 205. Between the two magnets 201, 202 is a magnetization region 203, in which a magnetizable security element (not shown) is arranged such that it is exposed to a magnetic field strength with a defined magnetic field direction. The magnetizable security element is transportable in a transport direction 204 through the magnetization region 203. In FIG. 2, isolines 206 of the strength of the magnetic field of the magnetizing device 200 are shown instead of the field lines 205.

A problem of the known devices for testing magnetizable security elements in value documents is that the magnetic fields for magnetizing the magnetic regions do not concentrate on the magnetic regions, but have a large stray field. Due to the unused stray field, stronger and therefore more expensive magnets must be used than would be necessary if the magnetic field were concentrated on the magnet regions to be magnetized. In addition, the stray field may disturb the sensor for detecting the magnetic fields generated by the magnetized security elements, which is commonly placed in the vicinity of the magnets.

Because modern value documents are equipped with magnetic regions with extremely high coercive magnetic material, very strong magnets must be used for magnetization, which in turn generate a strong stray field and thus render the measurement by the sensor considerably more difficult. For a reproducible magnetic bias, some magnetic flux densities of more than 0.5 Tesla are required.

SUMMARY

A magnetizing device includes a magnet and a magnetic field concentrator. The magnet has a magnetic field forming a magnetization region in which a magnetizable security element is exposed to a magnetic field strength having a defined magnetic field direction. The magnetic field concentrator is formed of a ferromagnetic material. The magnetic field concentrator is arranged in the magnetic field and amplifies and focuses the magnetic field in the magnetization region.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
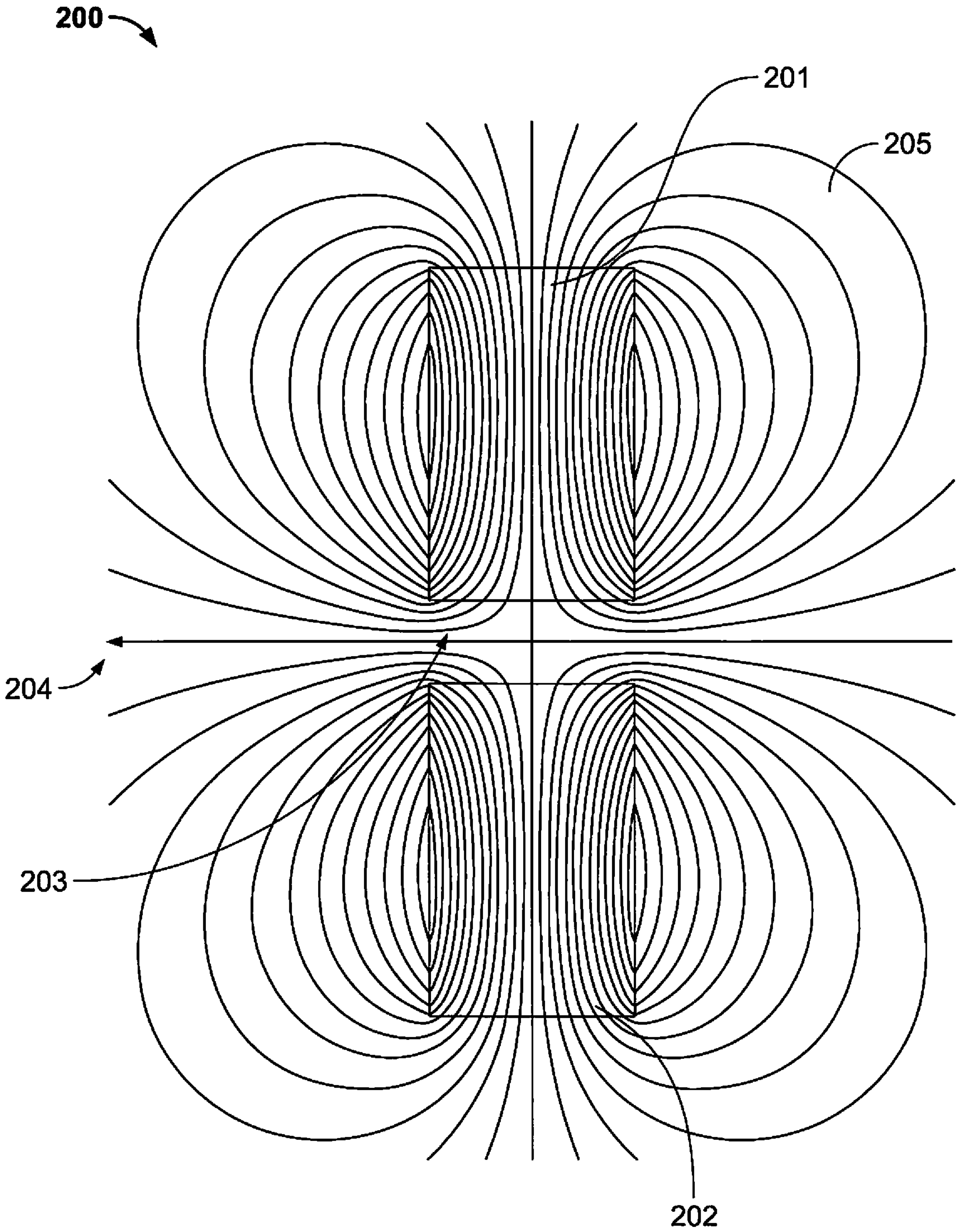
Fig. 1 PRIOR ART
FIG. 1 is a schematic diagram of a magnetizing device according to the prior art with a plurality of field lines of a magnetic field.
Figure 2:
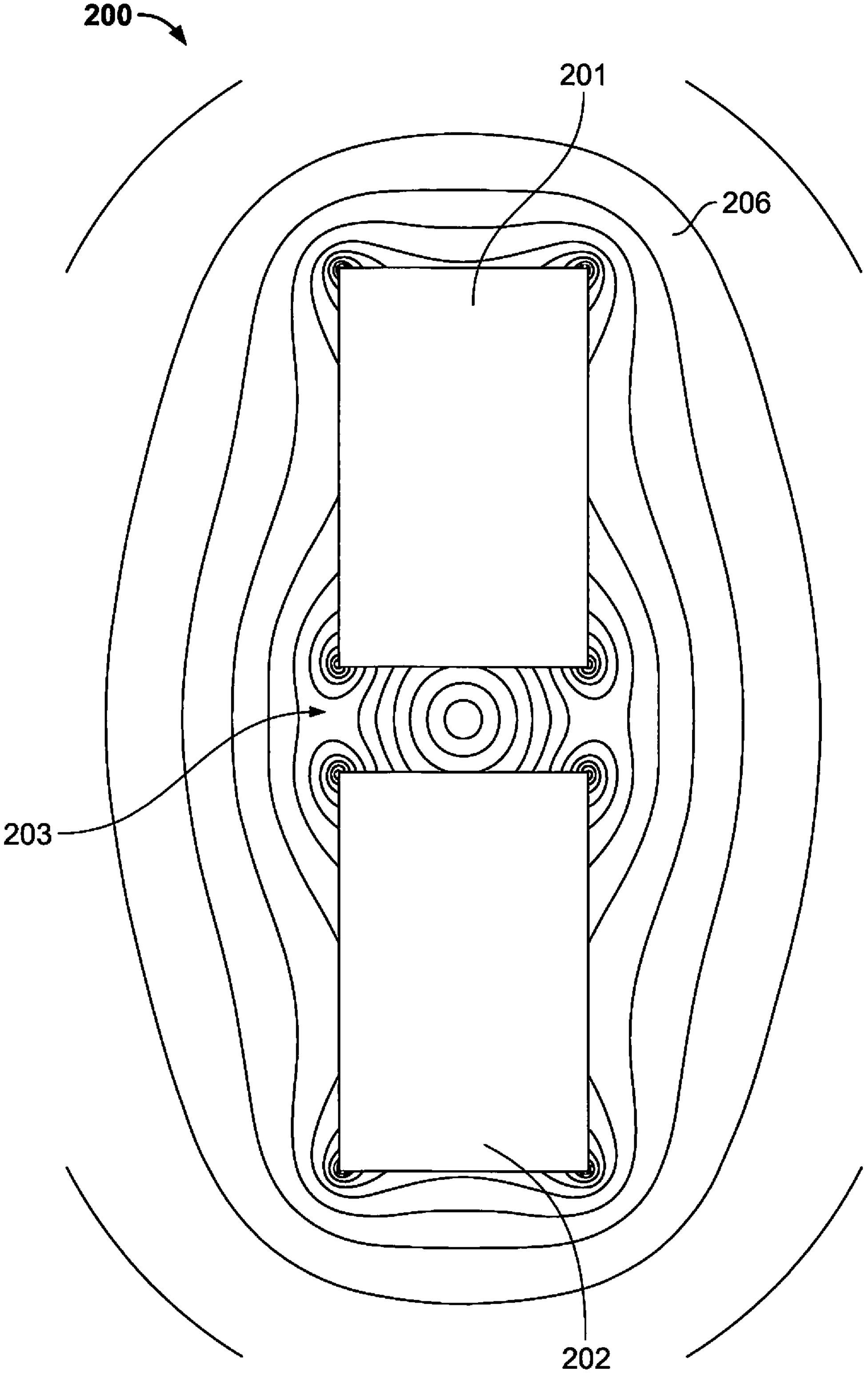
Fig. 2 PRIOR ART
FIG. 2 is a schematic diagram of the magnetizing device of FIG. 1 with a plurality of isolines of a strength of the magnetic field.

The present invention will be described in greater detail below with reference to the embodiments illustrated in the following figures. The same parts are provided with the same reference numerals and the same component names. Furthermore, individual features or combinations of features from the embodiments shown and described can also represent independent inventive solutions or solutions in accordance with the invention.

Figure 3:
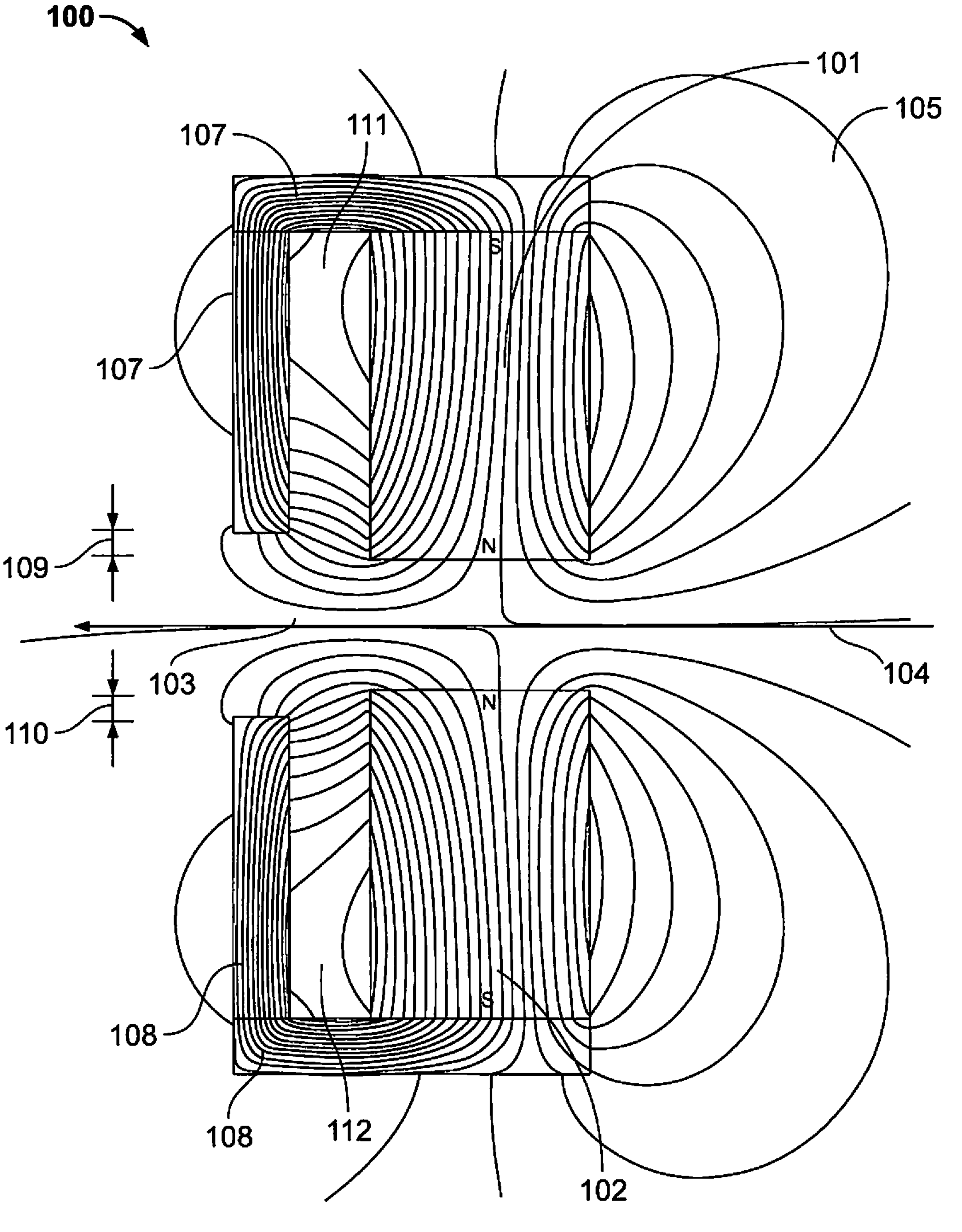
FIG. 3 is a schematic diagram of a magnetizing device according to an embodiment of the invention with a plurality of field lines of a magnetic field.

A magnetizing device 100 according to an embodiment of the present invention is shown in FIG. 3. The magnetizing device 100 comprises a first magnet 101 and a second magnet 102. The magnets 101, 102 have a common magnetic field, which is shown in the form of field lines 105. In an embodiment, the magnets 101, 102 each have a north pole and a south pole. The magnets 101, 102, in various embodiments, can be a permanent magnet or an electromagnet. In the shown embodiment, the magnets 101, 102 are each a permanent magnet in block form.

As shown in FIG. 3, between the two magnets 101 and 102 is a magnetization region 103, in which a magnetizable security element, for example of a value document, is arranged such that it is exposed to a magnetic field strength having a defined magnetic field direction. The magnetizable security element is transportable in a transport direction 104 through the magnetization region 103. The magnetizable security element is exposed to a magnetic field strength with a defined magnetic field direction during transport through the magnetization region 103 and is thereby magnetized.

In the embodiment shown in FIG. 3, the two magnets 101, 102 face each other opposite the magnetization region 103, with the first magnet 101 arranged on a first side of the magnetization region 103 and the second magnet 102 arranged on a second side of the magnetization region 103 opposite the first side. The magnets 101, 102 are positioned such that a north pole of each of the magnets 101, 102 points towards the magnetization region 103 and a south pole of each of the magnets 101, 102 points away from the magnetization region 103. In another embodiment, the south poles of the magnets 101, 102 may point towards the magnetization region 103 and the north poles of the magnets 101, 102 point away from the magnetization region 103. In this way, the security element is respectively exposed from above and from below to a magnetic field strength with a common, defined magnetic field direction. The described arrangement of the magnets 101, 102 also does not form a dipole field.

As shown in FIG. 3, a pair of magnetic field concentrators 107, 108 are arranged in the magnetic field of the magnets 101, 102 such that the magnetic field 105 is focused, amplified, and concentrated in the magnetization region 103. The magnetic field 105 concentrated in the magnetization region 103 has a weak stray field. A first magnetic field concentrator 107 is in a field of the first magnet 101 and is spaced apart from the first magnet by a first air gap 111 parallel to the transport direction 104. A second magnetic field concentrator 108 is in a field of the second magnet 102 and is spaced apart from the second magnet 102 by a second air gap 112 in the transport direction 104.

Each of the magnetic field concentrators 107, 108, in an embodiment, is formed of a ferromagnetic material. In an embodiment, each of the magnetic field concentrators 107, 108 is a sheet of soft magnetic material with high permeability, such as soft iron. Soft magnetic materials can be easily magnetized in a magnetic field. In addition, the magnetic flux density in soft magnetic materials is higher than the magnetic flux density generated by the exogenous magnetic field in air.

In the embodiment shown in FIG. 3, the magnets 101 and 102 protrude further into the magnetization region 103 in a direction perpendicular to the transport direction 104 than the magnetic field concentrators 107 and 108. The first magnetic field concentrator 107 is shorter by a first distance 109 than the first magnet 101. The second magnetic field concentrator 108 is shorter by a second distance 110 than the second magnet 102.

In another embodiment, the magnetizing device 100 has only the first magnet 101 with the first magnetic field concentrator 107, and the second magnet 102 and the second magnetic field concentrator 108 are omitted.

Figure 4:
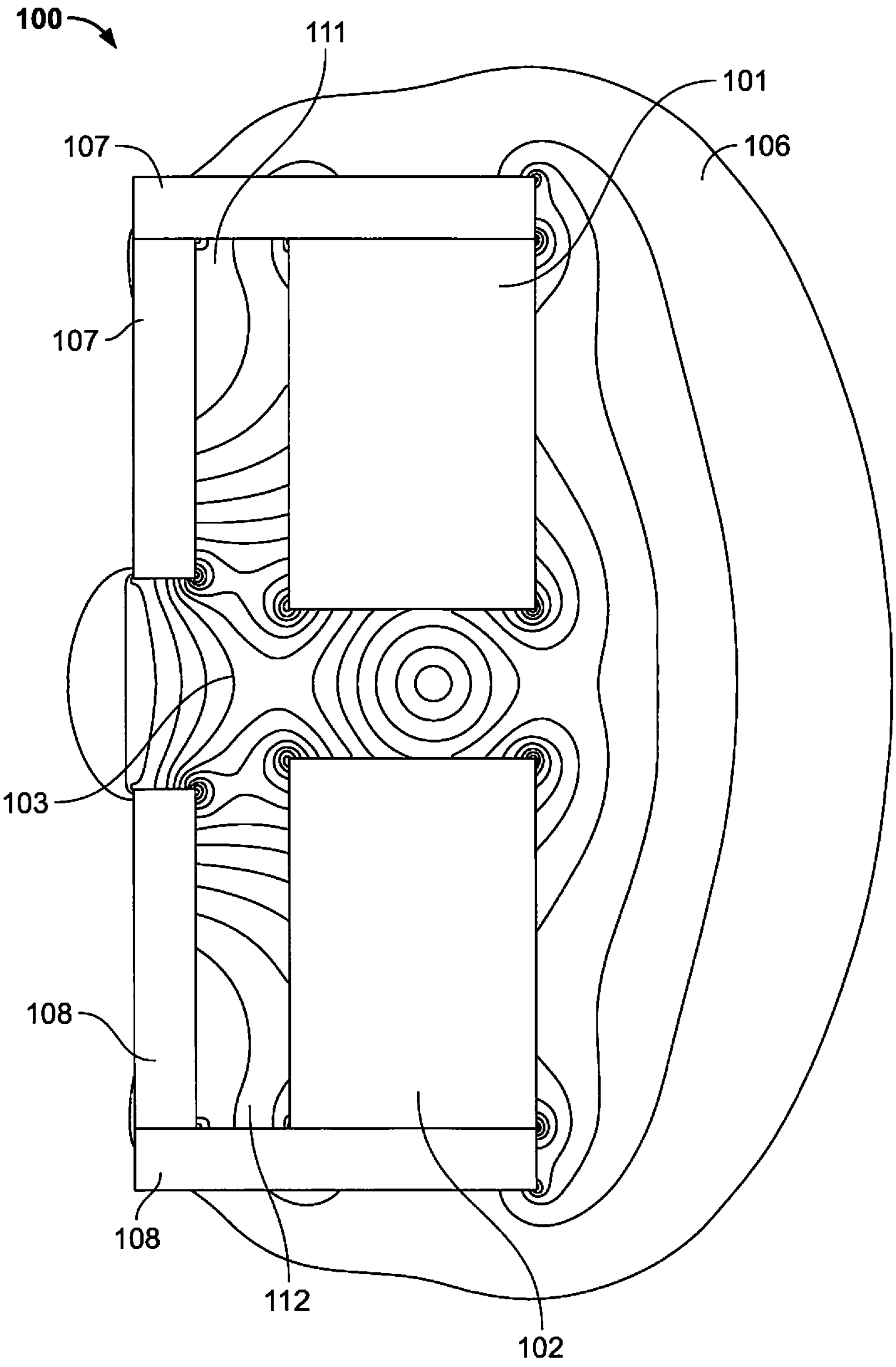
FIG. 4 is a schematic diagram of the magnetizing device of FIG. 3 with a plurality of isolines of a strength of the magnetic field.

The magnetizing device 100 is shown in FIG. 4 with isolines 106 of the strength of the magnetic field, instead of the field lines 105 of the magnetic field.

By increasing the magnetic field in the relevant magnetization region with the magnetic field concentrators 107, 108, the need for expensive permanent magnet material can be reduced, since a sufficiently strong magnetic field can be generated even with smaller magnets. By focusing the magnetic field in the magnetization region 103, moreover, the stray field of the magnet, which would disturb a sensor located near the magnetizing device 100, can be reduced.

In another embodiment, the magnetizing device 100 includes a further magnet or a further pair of magnets positioned downstream from the magnets 101, 102 in the transport direction 104. The further magnet or further pair of magnets is inversely polarized and has a lower magnetic field strength with respect to the magnets 101, 102. This configuration is suitable for testing value documents having a magnetizable security element with a first magnetic material and a second magnetic material, wherein a coercive field strength of the first magnetic material is weaker than a field strength of the first magnet 101 or magnets 101, 102 and stronger than the field strength of the further magnet or further pair of magnets, and a coercive field strength of the second magnetic material is weaker than the field strengths of the magnets 101, 102 and the further magnet or magnets. When the security element is transported through the magnetization region 103, both magnetic materials are polarized in the same direction. When the security element is transported through a further magnetization region of the further magnet or magnets, the magnetic material having the low coercive field strength is polarized in the opposite direction, while the magnetic material having the high coercive field strength retains its polarization. By such a magnetizing device, the two magnetic materials are reversely magnetized and therefore can be distinguished from a suitable sensor device.

Figure 5:
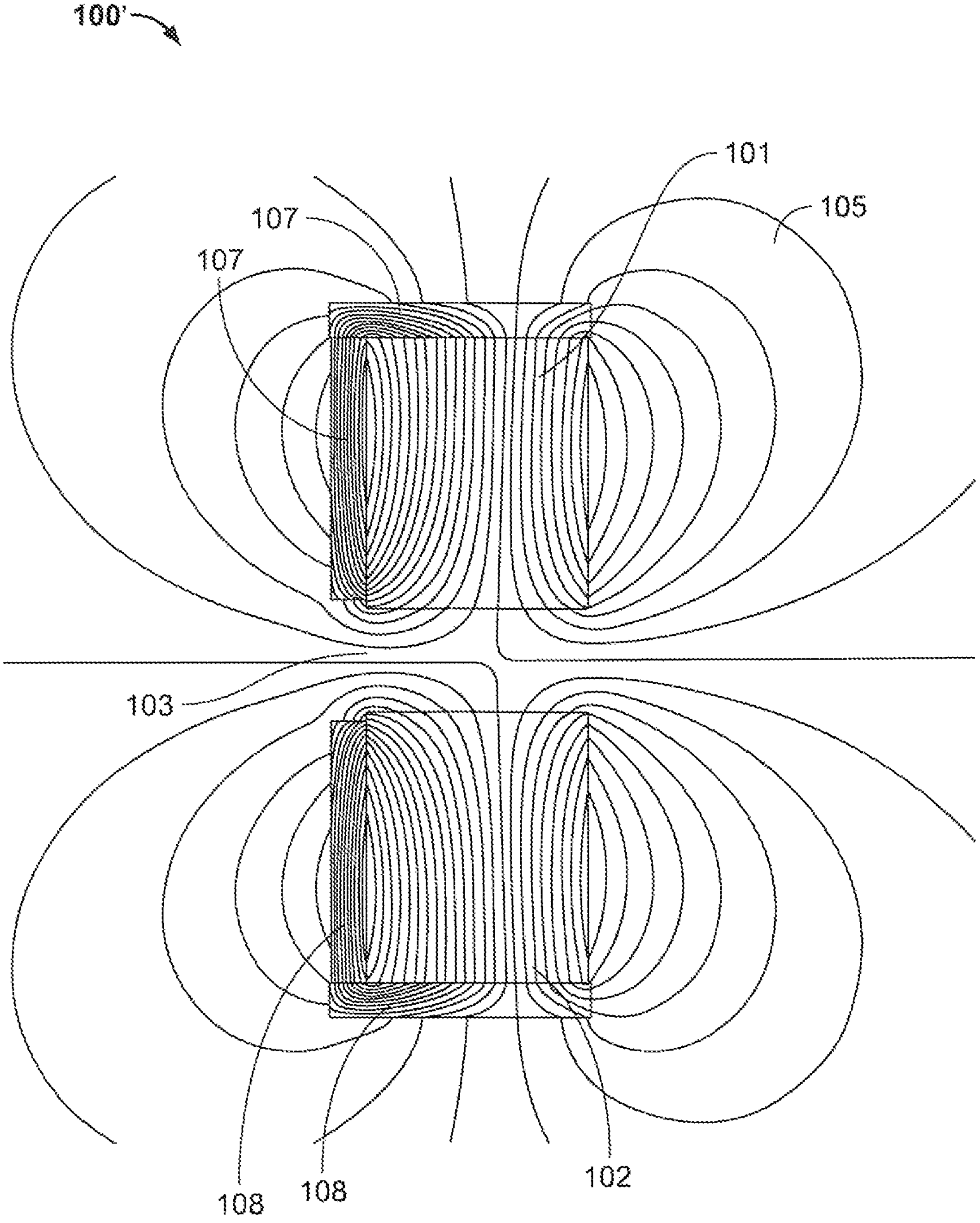
FIG. 5 is a schematic diagram of a magnetizing device according to another embodiment of the invention with a plurality of field lines of a magnetic field.

A magnetizing device 100' according to another embodiment is shown in FIG. 5. In the embodiment shown in FIG. 5, the magnetic field concentrators 107, 108 are arranged in the magnetic field of the magnets 101, 102 such that the magnetic field concentrators 107, 108 are directly adjacent to or applied directly to the magnets 101, 102, and no gap is provided between the magnetic field concentrators 107, 108 and the magnets 101, 102. Due to the magnetic attraction acting on the magnetic field concentrators 107, 108, this arrangement is simple and stable, as no further efforts are needed to keep the magnetic field concentrators 107, 108 in the desired position. In an embodiment, the first magnet 101 and the first magnetic field concentrator 107 are enclosed by a zinc die-cast housing and the second magnet 102 and the second magnetic field concentrator 108 are enclosed by a zinc die-cast housing.

Figure 6:
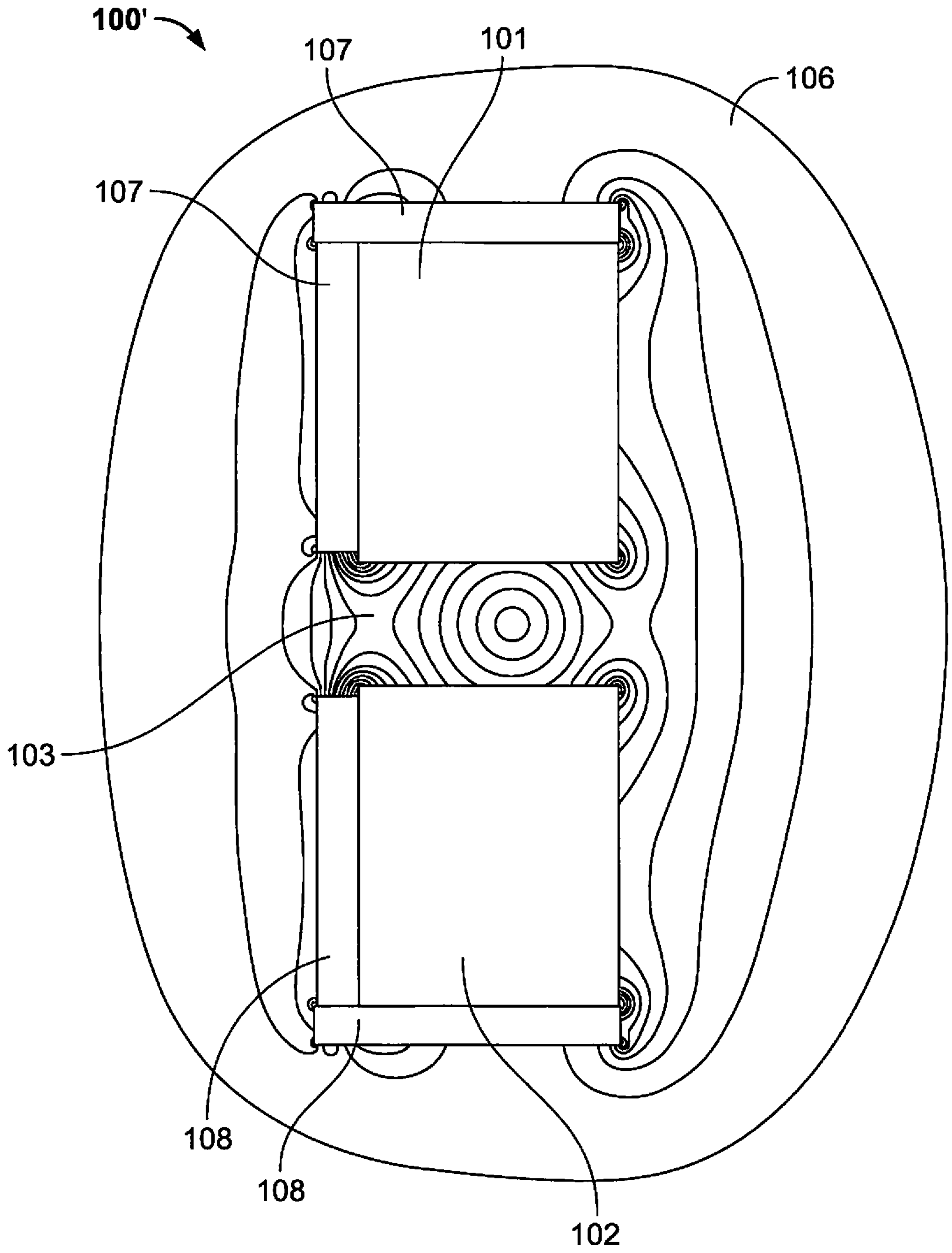
FIG. 6 is a schematic diagram of the magnetizing device of FIG. 5 with a plurality of isolines of a strength of the magnetic field.

The magnetizing device 100' is shown in FIG. 6 with isolines 106 of the strength of the magnetic field, instead of the field lines 105 of the magnetic field.

What is claimed is:

1. A magnetizing device, comprising:

a first magnet having a magnetic field forming a magnetization region in which a magnetizable security element is transported in a transport direction through the magnetization region and exposed to a magnetic field strength having a defined magnetic field direction, wherein the magnetic field is tangential to the transport direction of the magnetizable security element on an upper side and a lower side of the magnetizable security element; and a first magnetic field concentrator formed of a ferromagnetic material, the first magnetic field concentrator is arranged in the magnetic field and adapted to focus and amplify the magnetic field in the defined magnetic field direction in the magnetization region to result in a stronger magnetic field on one of an upper side and a lower side of the magnetizable security element.

2. The magnetizing device of claim 1, wherein the first magnet is a permanent magnet.

3. The magnetizing device of claim 2, wherein the first magnet has a block shape.

4. The magnetizing device of claim 1, wherein the first magnetic field concentrator is a sheet of soft magnetic material with a high permeability.

5. The magnetizing device of claim 1, wherein the first magnetic field concentrator deflects a plurality of magnetic field lines of the magnetic field to concentrate the magnetic field at a side of the first magnet facing the transport direction.

6. The magnetizing device of claim 1, wherein a surface of the first magnetic field concentrator is spaced apart from a surface of the first magnet and an air gap is formed between the first magnetic field concentrator and the first magnet.

7. The magnetizing device of claim 1 wherein a surface of the first magnetic field concentrator is directly adjacent to a surface of the first magnet.

8. A magnetizing device comprising a first magnet and a second magnet each having a magnetic field forming a magnetization region in which a magnetizable security element is exposed to a magnetic field strength having a defined magnetic field direction, wherein the magnetic field is parallel tangential to a transport direction of the magnetizable security element on an upper side and a lower side of the magnetizable security element;

a first magnetic field concentrator and a second magnetic field concentrator each formed of a ferromagnetic material, the first and second magnetic field concentrators arranged in the magnetic field and adapted to focus and amplify the magnetic field in the defined magnetic field direction in the magnetization region to result in a stronger magnetic field on both an upper side and a lower side of the magnetizable security element.

9. The magnetizing device of claim 8, wherein the first magnet and the second magnet face each other in the magnetization region, with the first magnet arranged on a first side of the magnetization region and the second magnet arranged on a second side of the magnetization region opposite the first side.

10. The magnetizing device of claim 9, wherein a north pole of each of the first magnet and the second magnet points toward the magnetization region, and a south pole of each of the first magnet and the second magnet points away from the magnetization region.

11. The magnetizing device of claim 9, wherein a south pole of each of the first magnet and the second magnet points toward the magnetization region, and a north pole of each of the first magnet and the second magnet points away from the magnetization region.

12. The magnetizing device of claim 1, wherein the first magnet and the first magnetic field concentrator are enclosed by a housing formed of a die-cast zinc.

13. The magnetizing device of claim 1, further comprising a further magnet arranged downstream of the first magnet in the transport direction.

14. The magnetizing device of claim 8, further comprising a further pair of magnets arranged downstream of the first magnet and the second magnet in a transport direction in which the magnetizable security element is transported through the magnetization region.

15. The magnetizing device of claim 14, wherein the further pair of magnets have a reverse polarization to the first magnet and the second magnet.

16. The magnetizing device of claim 15, wherein the further pair of magnets have a magnetic field strength less than the first magnet and the second magnet.

17. A method for magnetizing a security element, comprising:

forming a magnetization region with a first magnet in which the security element is exposed to a magnetic field strength having a defined magnetic field direction; and focusing and amplifying the magnetic field in the defined magnetic field direction to result in the magnetic field being stronger and tangential to a transport direction of the magnetizable security element in the magnetization region with a first magnetic field concentrator, wherein the first magnetic field concentrator is formed of a ferromagnetic material and is disposed in the magnetic field.

18. The method of claim 17, further comprising a second magnet with a second magnetic field concentrator, the first magnet with the first magnetic field concentrator forms the magnetization region with the second magnet and the second magnetic field concentrator.

19. The method of claim 18, further comprising forming a further magnetization region with a further pair of magnets arranged downstream of the first magnet and the second magnet in a transport direction in which the security element is transported through the magnetization region, the further pair of magnets have a reverse polarization to the first magnet and the second magnet and have a magnetic field strength less than the first magnet and the second magnet.

* * * * *